(12) United States Patent
Lopez et al.

(10) Patent No.: US 11,774,939 B2
(45) Date of Patent: *Oct. 3, 2023

(54) AUTOMATED MULTI-SILO AGGREGATE MANAGEMENT

(71) Applicant: SCHLUMBERGER TECHNOLOGY CORPORATION, Sugar Land, TX (US)

(72) Inventors: Miguel Angel Lopez, Sugar Land, TX (US); Marcos Suguru Kajita, Houston, TX (US); Bansi Chauhan, Stafford, TX (US); Christopher Todd Shen, Richmond, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 867 days.

This patent is subject to a terminal disclaimer.

(21) Appl. No.: 16/779,692

(22) Filed: Feb. 3, 2020

(65) Prior Publication Data

US 2020/0174446 A1    Jun. 4, 2020

Related U.S. Application Data

(63) Continuation of application No. 14/965,393, filed on Dec. 10, 2015, now Pat. No. 10,551,819.

(Continued)

(51) Int. Cl.
*G05B 19/406* (2006.01)
*E21B 41/00* (2006.01)
*E21B 43/267* (2006.01)

(52) U.S. Cl.
CPC ........ *G05B 19/406* (2013.01); *E21B 41/0092* (2013.01); *E21B 43/267* (2013.01); *G05B 2219/45076* (2013.01)

(58) Field of Classification Search
CPC .. E21B 43/267; E21B 41/0092; G05B 19/406
(Continued)

(56) References Cited

U.S. PATENT DOCUMENTS

| 4,353,482 A | 10/1982 | Tomlinson et al. |
| 5,413,154 A | 5/1995 | Hurst, Jr. et al. |

(Continued)

OTHER PUBLICATIONS

A&D, how to use load cells, retrieved from: https://www.aandd.jp/products/weighing/loadcell/introduction/pdf/6-1.pdf, date of publication confirmed as not later than Mar. 31, 2010 via internet archive.org, see included screenshot at the end of the document. (Year: 2010).*

(Continued)

*Primary Examiner* — Mohammad Ali
*Assistant Examiner* — Joshua T Sanders
(74) *Attorney, Agent, or Firm* — Michael L. Flynn (57) ABSTRACT

Methods of managing aggregate inventory. The methods include utilizing a dynamic protocol for an oilfield operation with aggregate from chambers of a multi-silo system wherein each chamber accommodates a single aggregate type throughout operations. However, the chambers also have a dynamic classification as either active, idle or reserved depending on the stage of operations. Once more, even though each silo may accommodate multiple chambers, unique techniques may be utilized to obtain real-time inventory information for each chamber via weight measurement of entire silos.

19 Claims, 6 Drawing Sheets

Related U.S. Application Data (60) Provisional application No. 62/093,272, filed on Dec. 17, 2014, provisional application No. 62/090,789, filed on Dec. 11, 2014.

(58) Field of Classification Search
USPC .......................................................... 700/281
See application file for complete search history.

(56) References Cited

U.S. PATENT DOCUMENTS

| | | | |
|---|---|---|---|
| 5,570,743 A | | 11/1996 | Padgett et al. |
| 6,186,654 B1 * | | 2/2001 | Gunteret, Jr. ....... B01F 33/8051 366/26 |
| 10,551,819 B2 * | | 2/2020 | Lopez .................. G05B 19/406 |
| 2004/0100858 A1 | | 5/2004 | Rondeau et al. |
| 2006/0224370 A1 * | | 10/2006 | Siebrits .................. E21B 43/26 703/10 |
| 2012/0219391 A1 * | | 8/2012 | Teichrob ................ B65D 88/32 414/293 |
| 2013/0142601 A1 * | | 6/2013 | McIver ................ B60P 1/6418 414/812 |
| 2014/0044508 A1 * | | 2/2014 | Luharuka .................. E04H 7/22 414/293 |
| 2014/0321950 A1 * | | 10/2014 | Krenek ................ B60P 1/6418 414/21 |

OTHER PUBLICATIONS

Microsoft, Microsoft Computer Dictionary, 5th edition, ISBN 0-7356-1495-4 ; published 2002; p. 211 "F" including "File" entry. (Year: 2002).*

* cited by examiner

AUTOMATED MULTI-SILO AGGREGATE MANAGEMENT

CROSS REFERENCE TO RELATED APPLICATIONS

This patent application is a continuation of U.S. patent application Ser. No. 14/965,393, entitled "Automated Multi-Silo Aggregate Management", filed on Dec. 10, 2015, which claims priority under 35 U.S.C. § 119(e) to U.S. Provisional Patent Application Ser. No. 62/090,789, entitled "Automatically Loading Dry Bulk Material Into a Bank of Silos or Compartments and Control Systems Therefor", filed on Dec. 11, 2014, and 62/093,272, entitled "Method of Calculating Load Weights", filed on Dec. 17, 2014, all of which are incorporated herein by reference in their entireties.

BACKGROUND

Exploring, drilling and completing hydrocarbon and other wells are generally complicated, time consuming and ultimately very expensive endeavors. As a result, over the years, well architecture has become more sophisticated where appropriate in order to help enhance access to underground hydrocarbon reserves. For example, as opposed to wells of limited depth, it is not uncommon to find hydrocarbon wells exceeding 30,000 feet in depth. Furthermore, today's hydrocarbon wells often include deviated or horizontal sections aimed at targeting particular underground reserves. Indeed, at targeted formation locations, it is quite common for a host of lateral legs and fractures to stem from the main wellbore of the well toward a hydrocarbon reservoir in the formation.

The above described fractures may be formed by a fracturing operation, often referred to as a stimulation operation. The stimulation or fracturing operation, involves pumping of a fracturing fluid at high pressure into the well in order to form the fractures and stimulate production of the hydrocarbons. The fractures may then serve as channels through the formation through which hydrocarbons may reach the wellbore. The indicated fracturing fluid generally includes a solid particulate or aggregate referred to as proppant, often sand. The proppant may act to enhance the formation of fractures during the fracturing operation and may also remain primarily within fractures upon their formation. In fact, the fractures may remain open in part due to their propping open by the proppant.

The above described proppant for the fracturing operation may be supplied from a proppant delivery unit located at the oilfield near the well. This unit is generally very large due to the amount of proppant that may be required for any given fracturing operation. For example, where the proppant is a conventional dry sand, a fully loaded unit may exceed half a million pounds in weight. Once more, as wells become deeper and of ever increasing complex architecture, efforts to provide even larger ready supplies of proppant at the oilfield are increasingly common. That is, more downhole fracturing locations may be involved, thus requiring a greater available supply of proppant.

From an equipment standpoint, greater on-site or near-site supplies of proppant may include the use of mobile silos or even larger stationary silos that are used to gravity feed a blender therebelow. Thus, a proppant slurry may be formed and utilized in short order to support various fracturing operations. As a practical manner, however, this means that potentially several million pounds of proppant may require transport and storage at a given location.

A variety of challenges are presented where management of such massive amounts of proppant or any aggregate is sought. For example, as a silo is filled or emptied for sake of ongoing operations, it is quite difficult to measure with precision the exact amount of proppant being added or consumed. That is, as a given operation calls for the addition or consumption of a particular type of proppant from a silo, it is likely to be in the neighborhood of tens of thousands of pounds. This may involve an operator manually feeding a line to a silo for a period and estimating an amount added (or consumed). That is, at present, there is no practical manner to precisely monitor the increasing or decreasing volume of proppant in a given silo in an automated manner during operations.

Furthermore, if proppant becomes unexpectedly depleted leaving the mixer empty, the entire operation may require shutting down. As a result, operations often proceed with substantially more proppant available than is actually required for the operation. That is, as opposed to shutting down operations at a substantial cost of time and frustration for the well developer, expenses are more commonly shifted to an inefficient operational aspect of delivering and storing much more proppant than is actually required.

Additionally, to ensure that there is a surplus of proppant, operators rely on manual record keeping and visual inspection of proppant levels within a silo. Such visual inspections also mean that an operator is being more regularly exposed to a dust and particulate that is swirling about or being kicked up during this period of loading or consumption.

Manual tracking and monitoring of the loading and consumption process also presents other challenges such as avoiding proppant contamination, when one proppant is loaded into the wrong silo, or even the possibility of overloading a silo. Ultimately, operators are currently left with proppant management systems that may be generally inaccurate and may result in an inefficient overabundance of proppant on site due to a lack of practical automation for such large scale system.

SUMMARY

A method of automated aggregate management at an oilfield via a mobile multi-silo system with each silo having multiple chambers. The method includes establishing a dynamic protocol for an operation at the oilfield that utilizes at least one aggregate. At the outset of operations each chamber may be assigned a static designation to accommodate a given aggregate type throughout the operation. Operations may be run with at least one aggregate from the system filled according to the static designation and the dynamic protocol. Additionally, each chamber of the system may be classified as one of idle and available for loading, active for loading or unloading, and reserved to prohibit loading or unloading wherein the particular classification is dependent upon the dynamic protocol during the running of the operation. Further, chambers may be refilled in accordance with the protocol in light of the dynamic classification so as to provide for running of the operation in a substantially continuous manner.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain embodiments of oilfield operations. Specifically, stimulation operations involving fracturing with aggregate in the form of proppant is described. However, other types of more automated aggregate management at an oilfield may benefit from management techniques detailed herein. For example, cementing and other applications that utilize a potentially large quantity of blended aggregates and other constituents may benefit from such management techniques. Indeed, so long as a management technique is employed that involves a dynamic protocol drawing from static designations of silo chambers holding a material such as aggregate that is carried out in light of dynamic chamber classifications of idle, active and reserved, appreciable benefit may be realized.

Figure 1:
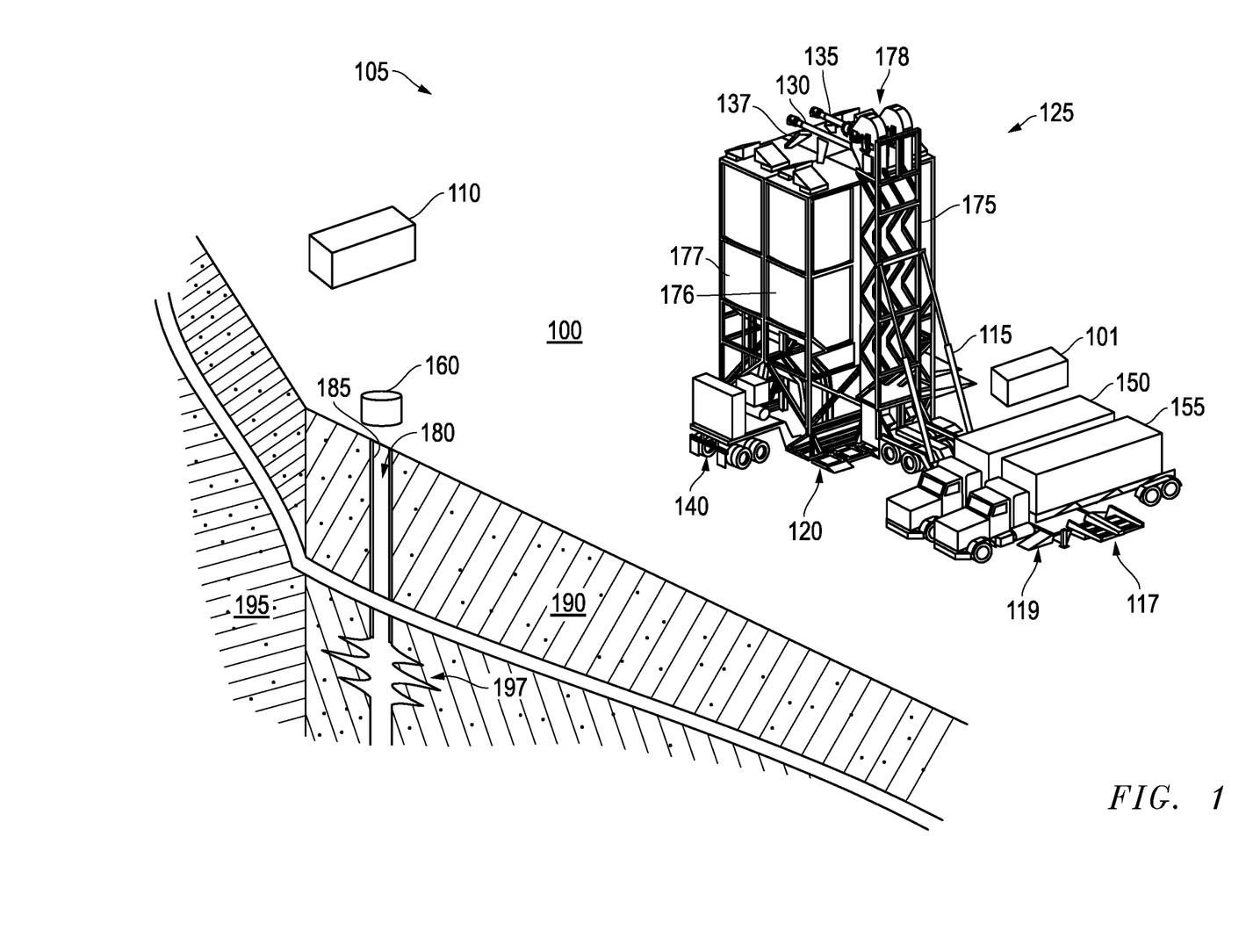
FIG. 1 is a perspective overview depiction of an oilfield utilizing an embodiment of an automated multi-silo aggregate management system.
Figure 2A:
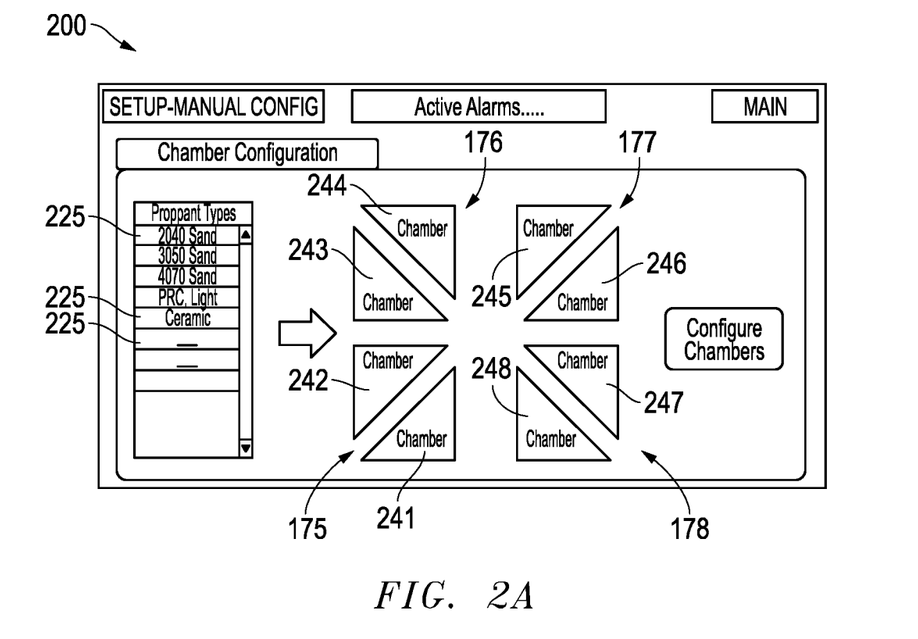
FIG. 2A is a front view of an embodiment of a user interface screen for setting up automated aggregate management of the system of FIG. 1.

Referring now to FIG. 1, a perspective overview depiction of an oilfield 100 is shown where an embodiment of an automated multi-silo aggregate management system 105 is located. The system 105 includes a mobile multi-silo assembly 125 with four separate silos 175, 176, 177, 178 supported by an underlying frame 120. As described further below, each silo 175-178 includes multiple chambers. For example, the silo 175 includes chambers 241 and 242 as shown in FIG. 2A and elsewhere. Furthermore, each such chamber is capable of holding tens of thousands of pounds of aggregate. Specifically, in the embodiments detailed further below, different types of proppant may be stored on a chamber by chamber basis in this fashion.

In an embodiment where the aggregate is proppant for stimulation operations as alluded to above, the proppant may be mixed along with other constituents at a mobile mixer 140 below the assembly 125 according to a predetermined protocol. The slurry that is formed from the mixture may then be delivered to a well 180 as part of a wellbore operation such as a fracturing application. For example, in the embodiment shown, the well 180 includes an upper casing 185 and traverses several thousand feet below a wellhead 160, across various formation layers 190 eventually reaching a perforated production region 197. Thus, a high pressure fracturing application may take place directed at delivering proppant to the region 197 so as to encourage opening and supporting hydrocarbon flow therefrom. A host of additional surface equipment, not apparent in FIG. 1, such as positive displacement pumps, a manifold, piping and other tools may be positioned at the oilfield surface 100 to support the application. The application itself may be directed by an operator at a control unit 110 with appropriate processing capacity. Similarly, a management unit 101 with sufficient processing capacity may be employed by another operator to direct the loading, monitoring and unloading of individual chambers of the silos 175-178 as needed in support of the application. However, in other embodiments, the features of the management unit 101 may be found at the more remote control unit 101. Regardless, in an effort to maintain a substantially continuous supply of slurry for the fracturing application, an operator may employ a user interface and controls through the management unit 101 to direct ongoing filling aggregate into the silos 175-178 and consumption therefrom.

As shown in FIG. 1, a conveyor 117 and bucket elevator 175 may be utilized to obtain aggregate from proppant delivery trucks 150, 155 or "sand haulers" for routing to augers 130, 135 for filling of the silos 175-178. However, in other embodiments, pneumatic equipment for filling of the silos 175-178 may be utilized. Regardless, in the embodiment shown, chutes 137 from the augers 130, 135 may determine which specific chamber 241-248 a particular aggregate or proppant type is delivered to (e.g. see FIG. 2A). Further, as suggested above, this type of loading as well as aggregate consumption from the silos 175-178 may be directed by an operator at a management unit 101 to support substantially uninterrupted fracturing. That is, as detailed below, a substantially continuous supply of aggregate, and therefore slurry, may be made available in an efficient, just-in-time, manner to support the application or operation.

As shown in FIG. 1, the management unit 101 is adjacent the silo assembly 125. Thus, an operator having direct access and visibility of the aggregate supply also has more direct control over filling and consumption of aggregate through the unit 101. In addition to directing the filling and consumption of aggregate, the management unit 101 may also record a substantial amount of historical data in terms of ongoing operations. Indeed, days or months' worth of data, including from prior applications at the well 180 may be of value and stored at the unit 101. That is, as any given load of aggregate is brought to the assembly 125 or consumed, its delivery and/or consumption may be tracked at the unit 101.

At the outset, tracking may initially include scanning or manually entering data regarding the aggregate to be supplied to the assembly 125. However, as detailed below, the method of ensuring the amount of the load and subsequent consumption may be monitored with a more sophisticated level of data acquisition and tracking. Further, depending on entry of the new load information, the unit 101 may help to determine, based on a protocol or pre-set rules at a processor thereof, what particular chamber of what particular silo 175-178, the aggregate/proppant should be delivered to in the first place.

Referring now to FIG. 2A, with added reference to FIG. 1, a front view of an embodiment of a user interface screen is shown with a display 200. The screen may be utilized by an operator at a remote location such as at the control unit 110 or, if desired closer to the silo assembly 125, at the management unit 101 where the operator has more direct access thereto. Regardless, the screen includes the display 200 for initially setting up automated aggregate management of the system 105 of FIG. 1. For example, each of the eight different chambers 241-248 may be assigned a pre-determined type of proppant 225 to be stored therein to the exclusion of all others. Of course, depending on the protocol of the application, and overall proppant needs, more than one chamber 241-248 may be assigned the same proppant type 225. That said, once assigned a given proppant type 225, a chamber 241-248 will be excluded from accommodating other types throughout operations. In addition to preventing contamination, this also serves as a valuable inventory tool as proppant is loaded, stored and consumed over the course of operations.

Figure 2B:
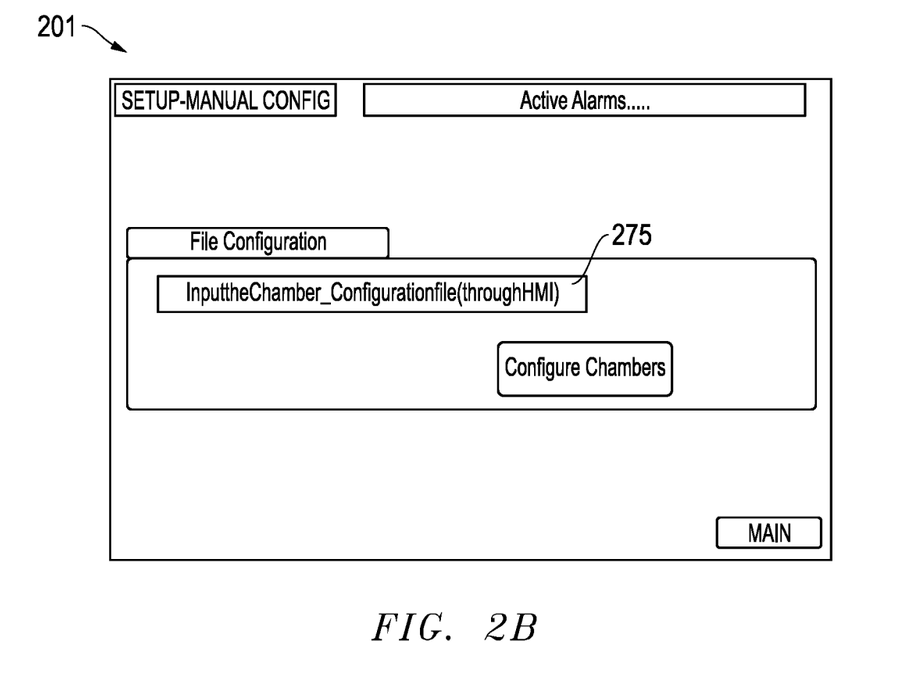
FIG. 2B is a front view of another embodiment of a user interface screen for selecting a predetermined automated aggregate management setup for the system of FIG. 1.

Continuing with reference to FIG. 2A, the chambers 241-248 are shown oriented relative one another in groups representing different silos 175-178. That is, as shown in FIG. 1 there are four different silos 175-178, each accommodating two different chambers 241-248 so as to provide a total of eight different possible proppant assignments. Additionally, as indicated above, these unchanging or "static" assignments are input by a user depending on the protocol for the application to be run. However, with particular reference to FIG. 2B, in another embodiment, a predetermined automated aggregate management setup may be employed. That is, rather than an operator manually making the noted assignments at the screen, a display 201 may be presented that allows an operator to select one of a variety of different files 275 with pre-stored chamber assignment information. Thus, human error may be minimized by ensuring that so long as the proper file with proper pre-stored information is selected for the application, the appropriate proppant assignments will be provided for management on a chamber by chamber basis.

In addition to chamber assignments for aggregate/proppant, the initial setup for ongoing operations may also account for chamber weights. Of course, in the embodiments shown, multiple chambers 241-248 are incorporated into single silos 175-178. So, for example, the weight of chambers 241 and 242 are the combined weight of the corresponding silo 175. Therefore, with added reference to FIGS. 4B and 5, available weight information from load cells 510, 520, 530, 540 or other suitable weight determining mechanism, pertaining to the weight of the empty silo 175 may be substantially zeroed out or discounted from subsequently detected weight as the chambers 241 and/or 242 are filled or emptied. Further, a requirement that only one chamber 241 or 242 of the silo 175 be "active" for filling or emptying at any given point in time, allows for ongoing weight detections from the load cells 510-540 to be a reliable indicator of the actual inventory of proppant in each chamber 241, 242.

Figure 4A:
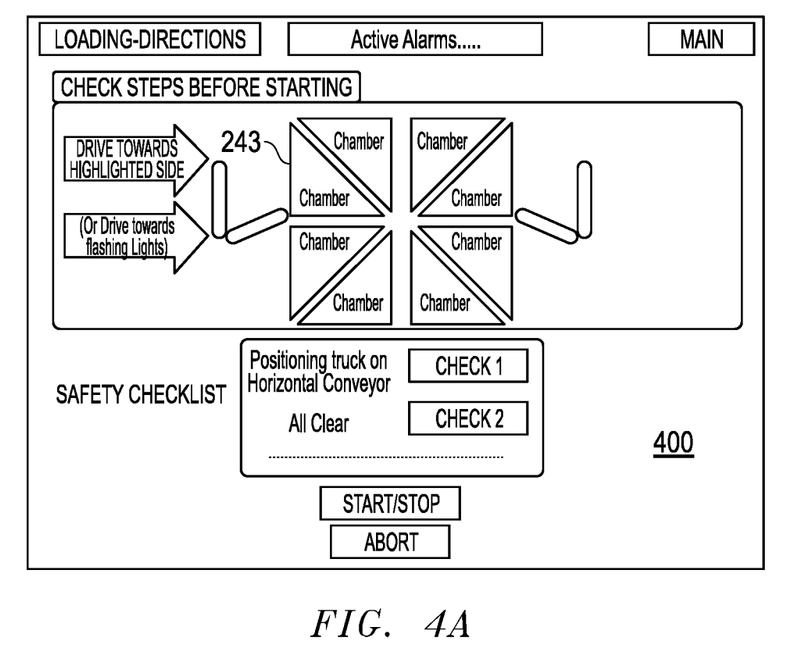
FIG. 4A is a front view of an embodiment of a user interface screen for operator directed reloading of aggregate inventory during operations of the system of FIG. 1.

With brief added reference to FIG. 4A, once the proppant assignments are entered, the rules of the protocol will call for the actual loading of materials into the chambers 241-248. As a practical matter, with added reference to FIG. 1, this will result in the operator directing different specifically called for trucks 150, 155 to appropriate locations at the assembly 125 for unloading. This may take place over and over until the chambers 241-248 are filled according to the rules of the protocol for the application to be run during oilfield operations. The initial loading and set up as described may help avoid contamination, enhance inventory tracking, avoid overflow and even enhance safety by providing operators with step by step safety instructions during loading. Additionally, the display 200, 201 may provide diagnostics and troubleshooting as needed. Further, as detailed below, the protocol itself may be forward "thinking" and allow for the reserving of particular chambers 241-248 based on anticipated future operational needs and not just the current needs of the near-term application.

Figure 3A:
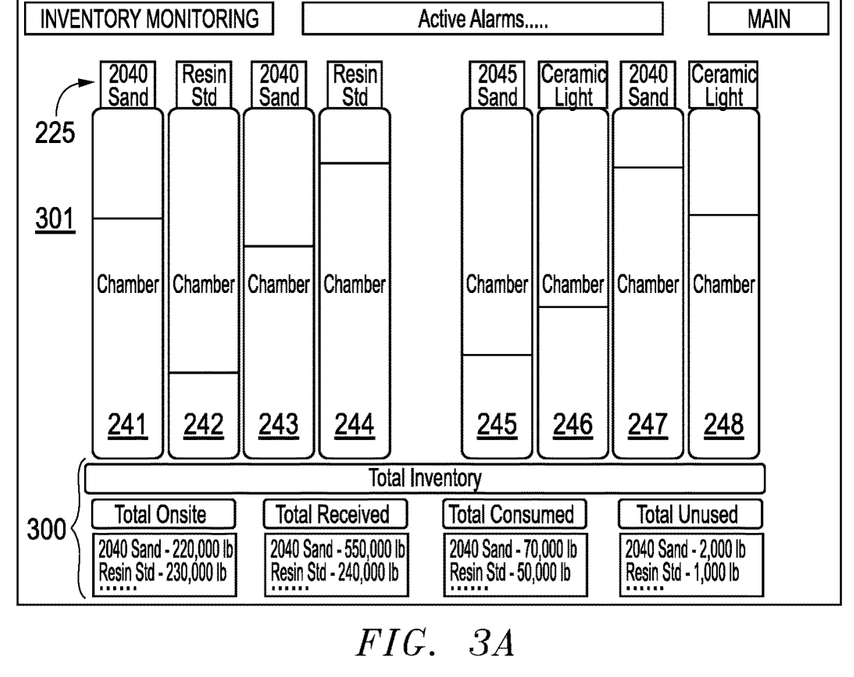
FIG. 3A is a front view of an embodiment of a user interface screen for monitoring aggregate inventory use during operations of the system of FIG. 1.

Referring now to FIG. 3A, once the assembly 125 of FIG. 1 is set up, an application may proceed as an operator witnesses a monitoring display 301. For example, the display 301 as shown in FIG. 3A allows an operator to view consumption and depletion of proppant on a chamber 241-248 by chamber 241-248 basis. That it, each graphic representation of each chamber 241-248 notes an exclusive proppant type 225 for that chamber 241-248 as well as an approximate proppant level therein. As noted above, these levels are available due to the real-time weight information that is available as well as level sensors where provided. With reference to such a display 301, the operator may have information readily available as to all proppant in terms of amounts received, consumed, unused, etc. This information may be utilized in determining ongoing needs in light of the overall application or various stages thereof as well as the rate of consumption taking place in real-time, even from a chamber by chamber standpoint. In the embodiment of FIG. 3A, the display 301 also presents dynamic real-time numeric inventory information 300 to the operator. Thus again, an operator monitoring the display 301 is likely to have an idea of upcoming supply needs of the system 125 of FIG. 1.

Figure 3B:
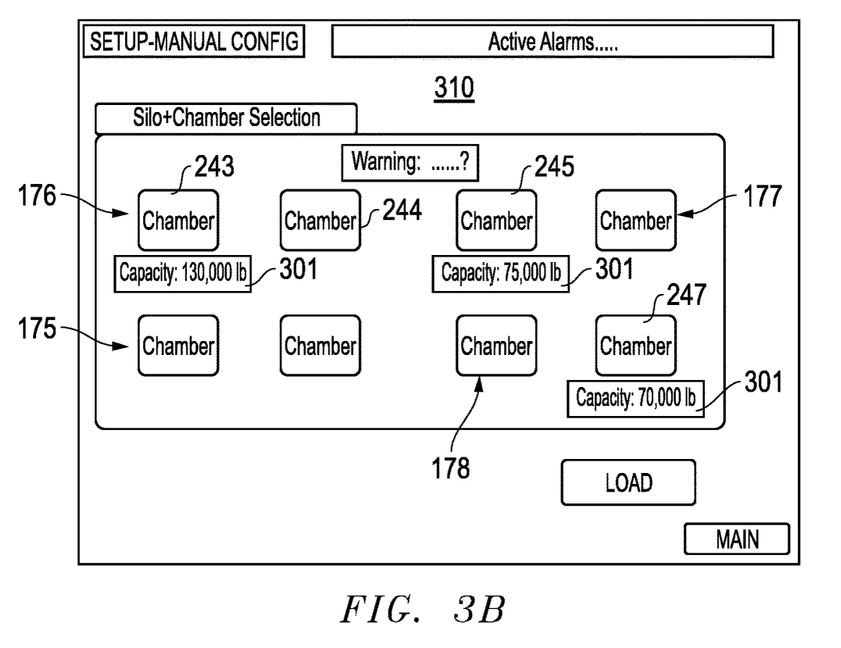
FIG. 3B is a front view of an embodiment of a user interface screen to evaluate reloading options of aggregate inventory during operations of the system of FIG. 1.

With reference now to FIG. 3B, a front view of an embodiment of a user interface screen is shown where the display 310 serves as an aid to the operator in evaluating chamber reloading options. That is, in light of depleting inventories, new proppant may be required. However, reloading thereof may depend on initial chamber assignments as to proppant type as well as the stored protocol being carried out by a processor of the control 110 and/or management 101 unit of the system 105 of FIG. 1.

Continuing with reference to FIG. 3B, the display presents the chambers 241-248 in a manner highlighting available capacity 301 therein. As detailed above, this may be determined by the ongoing monitoring of weight information provided to the processor of the control 110 or management 101 unit. Thus, depending on upcoming aggregate/proppant needs, the operator may select one of the chambers 243, 245, 247 with available capacity for re-loading.

For example, with added reference to FIG. 1, consider a scenario where chamber 247 is assigned a proppant type that is not of a near term need in operations but chambers 243 and 244 are both assigned for holding the same type of proppant that is of near term need. The operator may then consult the protocol to determine whether chamber 243 with an available capacity of 130,000 lbs. or chamber 245, with an available capacity of 75,000 lbs. is most appropriate for selecting. Certainly, if the near term need for the proppant type at issue is near or above 75,000 lbs. the operator would select chamber 243 for reloading.

Continuing with the above-proposed example and added reference to FIG. 1, it is of course, possible that the near term need of the given proppant type might exceed 130,000 lbs., in which case, both chambers 243, 245 would be selected for sequential re-filling. In this situation, one chamber 243 of a silo 176 would be activated for filling while the other 244 remained inactive. By the same token, at this point in time needs for this proppant type would be met by the noted chamber 245 of another silo 177. Once the initial chamber 243 is filled, the chamber 243 may now move to an active state for consumption while the other chamber 245 is temporarily moved to an inactive state and a chute 137 or diverter repositioned thereover. This chamber 245 may then be moved to an active state for filling. In this way, the mobile mixer 140 below the system 125 is not noticeably interrupted nor the operations in general. Instead, applications may proceed uninterrupted in a substantially continuous fashion.

Referring now to FIG. 4A, a front view of an embodiment of a user interface screen is shown with a display 400 that may be presented to an operator at the refilling site near the physical system 125 of FIG. 1. So, for example, in one embodiment, the display 301 of FIG. 3B may be presented to an operator at either unit 110, 101 of FIG. 1. However, the display 400 of FIG. 4A may be presented to an operator at the management unit 101 in the vicinity of the actual refilling. Thus, the display presents the operator with step by step direction and aid in terms of where to position trucks 150, 155, safety measures, checks and other practical issues which may emerge over the course of actual unloading/filling of chambers (e.g. 243).

The display 400 of FIG. 4A may present a variety of practical alerts and guides to the operator apart from the general protocol. For example, warning of overfill conditions or alternatively, unanticipated depletion may occur based on level sensor indicators. Additionally, the display 400 may have built in temporary delays in terms of sequencing between one chamber being filled or emptied and another. This way, operations may proceed with assurance of proper weight and inventory tracking so as to avoid overloading or premature depletion of a chamber. This display 400 may also provide some guidance and flexibility in terms of loading options. For example, the display 400 may guide the operator through options of elevator versus pneumatic filling, the use of a skirted receiving belt for dust reduction, inclined versus horizontal transloading, and a variety of other unloading options. Once more, one type of rig-up guidance may be provided in light of other guidance. This may include a recognition, for example, that the elevator 175 is unavailable for loading a chamber because it is already in use for another chamber and thus, guide the operator to proceed with another unloading at another chamber (of another silo) via pneumatic means.

Figure 4B:
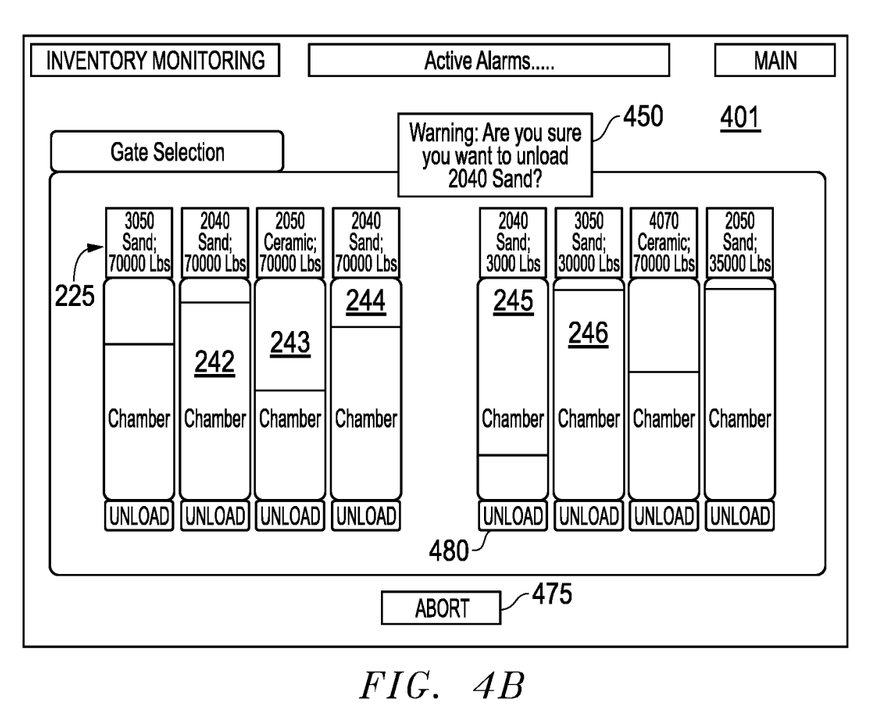
FIG. 4B is a front view of an embodiment of a user interface screen for operator directed emptying of aggregate inventory during operations of the system of FIG. 1.

Referring now to FIG. 4B, another display screen 401 is presented to an operator which allows direct control over emptying of the aggregate/proppant during operations. That is, again in contrast to the monitoring display 301 of FIG. 3A, this display screen 401 may be of particular benefit to an operator right at the site of the system 125 site where the potential for practical intervention and manual involvement may be more likely. Again, the display 401 notes the particular proppant types 225 assigned to each chamber 241-248. Indeed, in the specific example depicted, the same proppant type, "2040 Sand" is allocated to different chambers 242, 244, 245. However, it is evident that one of these chambers 244 is of a far lower level than the others 242, 245 and yet, slated for unloading therefrom according to the protocol being carried out. Thus, as is also evident, the display presents a confirmation warning 450 to the operator to allow for the opportunity to abort 475 the unloading from that particular chamber 244. If this abort intervention is selected by the operator, subsequent protocol options may be presented to allow for selecting of unloading from another chamber 242, 245. Of course, the operator may also select unload 480 where depletion of the chamber 245 is not of significant concern.

As alluded to above, the determination of whether to unload 480 may not only be a matter of whether or not sufficient proppant is available in the chamber 243. That is, protocols may call for one or more chambers to remain "reserved" for later activation, whether for filling or unloading, depending on the anticipated needs of ongoing operations. Thus, while an operator may not be concerned about immediate depletion of the chamber 243, there may be a need to hold a sufficient amount of proppant from this chamber in reserve based on the protocol. For example, the controlling processor of a unit 101, 110 may predetermine that at a later time alternate proppant sources may be unavailable (e.g. 242, 245) due to adjacent chambers 243, 246 being activated at such time. In this scenario, the operator may be required to abort 475 and draw from alternate sources 242, 245 so as to hold the noted chamber 245 in reserve for the indicated later time. In this sense, the protocol of this embodiment is "forward looking", thereby enhancing resource allocation and the ability for substantially continuous operations. By the same token, a variety of detected safety and other issues may require aborting of unloading from any or all chambers. Thus, the ability of the operator to abort 475 through the display 401 may be beneficial for a variety of additional reasons.

Figure 5:
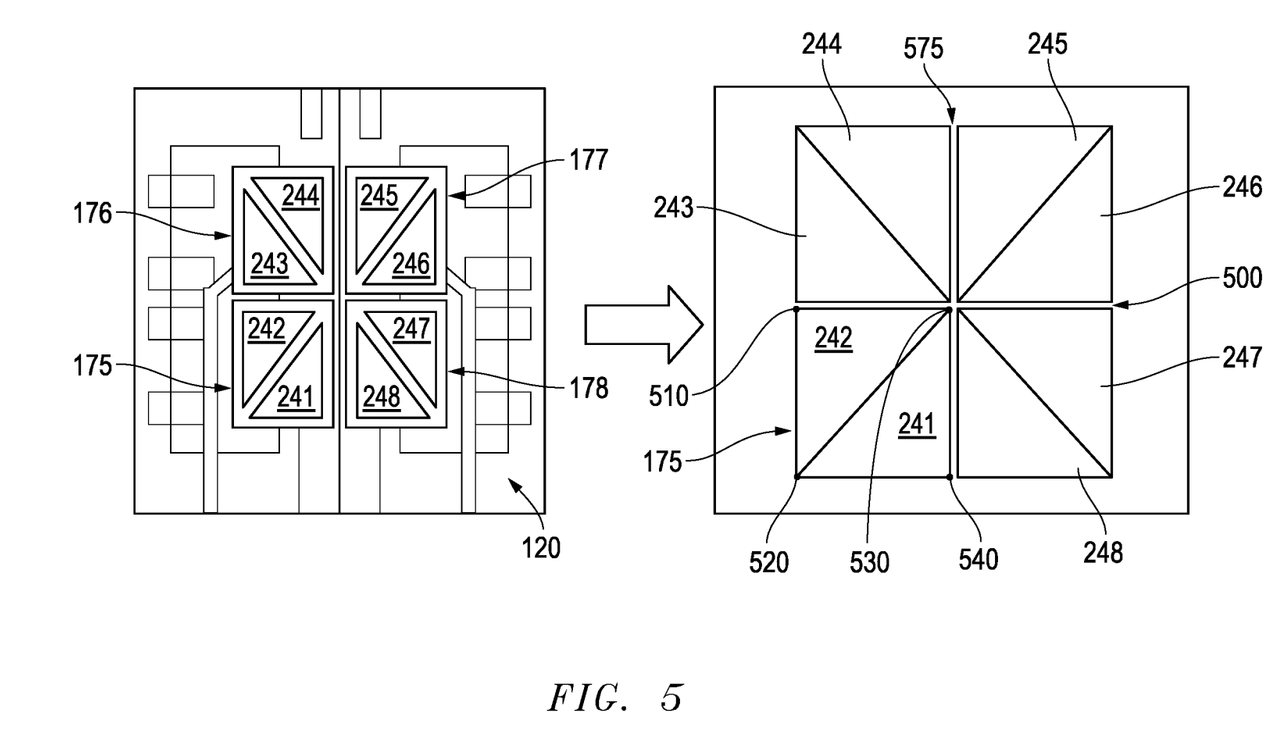
FIG. 5 is a schematic view of a multi-silo arrangement of the system of FIG. 1 with load cells to provide real-time aggregate inventory information for individual compartments of each silo of the system.

Referring now to FIG. 5, is a schematic top view of a multi-silo arrangement of the system 125 of FIG. 1 is shown. In this view, the silos 175-178 and chambers 241-248 are apparent over the frame 120 at the left depiction of the system 125. However, at the right depiction of the system 125, spaces 500, 575 between the individual silos 175-178 are apparent. Thus, with particular reference to the silo 175 it is also apparent that a particular set of load cells 510-540 is shared for the entire silo 175. That is, the load cells 510-540 are not made available on a chamber by chamber basis. This means that two chambers 241, 242 share the same set of load cells for sake of estimating inventory therein at any given point in time.

In spite of this setup, as detailed hereinabove, only one chamber 241 or 242 may be active for loading or unloading at any given point in time. Thus, the processor acquiring information from the cells 510-540 may still allocate and track inventory on a chamber by chamber basis (i.e. even in absence of chamber by chamber load cells or other dedicated weight measurement tools). Specifically, the total weight of a given silo 175 is the empty weight known at the initial set up of operations plus the aggregate loaded thereinto. Therefore, as the weight changes due to loading or unloading, aggregate/proppant inventory may be tracked through the load cells 510-540 because only one chamber 241 or 242 may be affected at any given point in time. Indeed, this method of inventory tracking may be utilized where more than two chambers 241, 242 are allocated to a given silo 175. That is, so long as only one chamber is active, this technique for tracking inventory may be utilized.

Figure 6:
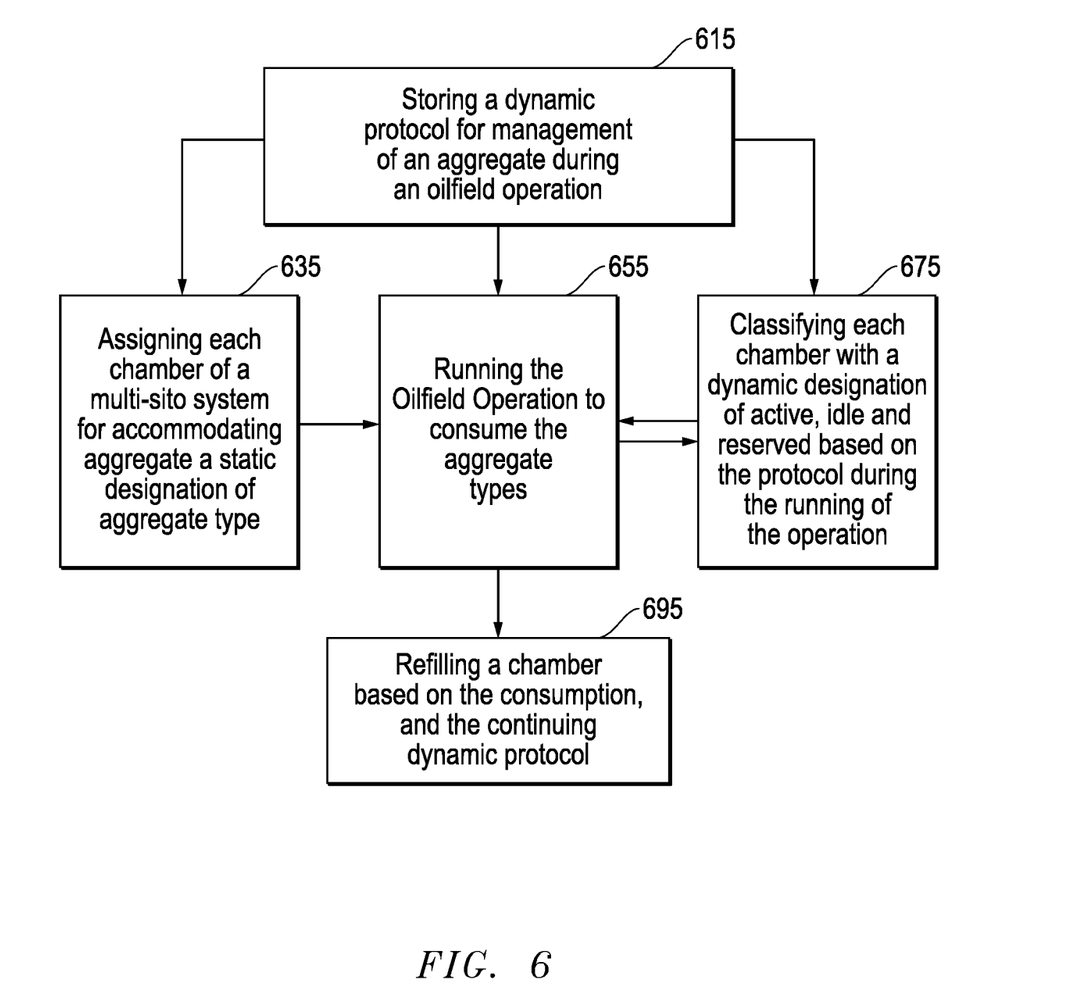
FIG. 6 is a flow chart summarizing embodiments of employing automated multi-silo aggregate management techniques at an oilfield.

Referring now to FIG. 6, a flow chart is shown summarizing embodiments of employing automated multi-silo aggregate management techniques at an oilfield. As detailed above, a dynamic protocol for a given application such as stimulation or fracturing operations may be set up or selected and stored at a processor of a control or management unit as indicated at 615. The protocol may rely upon a dedicated assignment of a variety of chambers to accommodate a particular aggregate or proppant type to the exclusion of all others (see 635). Further, multiple chambers may share the same silo. Nevertheless, operations may proceed as noted at 655 with aggregate being consumed while the inventory thereof is reliably monitored due to a unique manner of accounting for silo weight in light of silo chamber classifications. Namely, only one chamber of a given silo may be active at any given point in time.

As alluded to above, the operations may proceed with each chamber being dynamically classified in terms of a state of active for filling or consuming, idle, or reserved for later use as indicated at 675. Depending on the protocol being carried out and stages thereof, a chamber's state may dynamically change, for example from active in terms of consuming to idle until reactivated for filling. Indeed, as indicated at 695, chambers may be refilled based on consumption and monitored aggregate level depending on the stages of the protocol remaining for the operation.

Embodiments described above allow for efficient inventory tracking of proppant or other aggregate at an oilfield during ongoing operations in an automated fashion. Indeed, techniques detailed herein largely eliminate manual accounting techniques for monitoring inventory of aggregate. Once more, the techniques allow for the substantially continuous use of proppant during operations without necessarily requiring an overabundance of proppant on site. Ultimately, a safer and more reliably efficient mode of aggregate management is provided through the automated operator friendly techniques detailed herein.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. An automated multi-silo aggregate management system comprising:
   a multi-silo assembly, wherein each silo of the multi-silo assembly is equipped with a plurality of chambers, and wherein each chamber of the plurality of chambers is designated to accommodate a single aggregate type to the exclusion of any other aggregate types;
   a loading mechanism for filling each chamber of the plurality of chambers with aggregate based on respective dynamic classifications assigned to the plurality of chambers; and
   a processor equipped unit with a user interface for directing running of an operation at an oilfield with aggregate unloaded from at least one chamber of the multi-silo assembly, wherein the process is configured to:
      receive an indication of an amount of aggregate in each chamber during the operation;
      update the respective dynamic classifications assigned to each chamber based at least in part on the amount of aggregate in each chamber during the operation; and
      cause a particular chamber of the plurality of chambers to be refilled based on the respective dynamic classifications during the operation, wherein the respective dynamic classification for the particular chamber is updated to active for loading;
   wherein updating the respective dynamic classification of the particular chamber of the plurality of chambers of a silo as active for loading prohibits updating the respective dynamic classification of any other chamber of the plurality of chambers of the silo as active for loading or unloading.

2. The automated multi-silo aggregate management system of claim 1, wherein the loading mechanism comprises a bucket elevator.

3. The automated multi-silo aggregate management system of claim 1, wherein the loading mechanism comprises pneumatic equipment.

4. The automated multi-silo aggregate management system of claim 1, comprising a mixer positioned below the multi-silo assembly for obtaining aggregate unloaded from the chamber.

5. The automated multi-silo aggregate management system of claim 1, comprising a weight determining mechanism coupled to each silo, and wherein the processor equipped unit is configured to dynamically track inventory of aggregate in each chamber.

6. The automated multi-silo aggregate management system of claim 5, wherein the weight determining mechanism comprises at least one load cell.

7. A method for managing aggregate at an oilfield with a mobile multi-silo system, each silo of the mobile multi-silo system having a plurality of chambers therein, the method comprising:
   establishing a dynamic protocol for an operation at the oilfield utilizing at least one aggregate;
   assigning each chamber a static designation for accommodating a given aggregate type throughout the operation at the outset of the operation;
   discharging at least one aggregate from at least one of the chambers to a mixer disposed below each of the chambers of the mobile multi-silo system;
   running the operation at the oilfield with at least one aggregate from the mobile multi-silo system filled according to the static designation and the dynamic protocol;
   receiving an indication of an amount of aggregate in each chamber during the operation;
   classifying each chamber with a respective dynamic classification, the respective dynamic classification dependent upon the dynamic protocol and the amount of aggregate in each chamber during the operation; and
   refilling a chamber in accordance with the dynamic protocol in light of the respective dynamic classification to enable running of the operation substantially continuously;
   wherein the classifying of a particular chamber of the plurality of chambers of a silo with the respective dynamic classification as active and loading prohibits updating the respective dynamic classification of any other chamber of the plurality of chambers of the silo as active and loading or active and unloading.

8. The method of claim 7, wherein the respective dynamic classification comprises idle and available for loading, idle and available for filling, active and loading, active and unloading, or reserved to prohibit loading and unloading.

9. The method of claim 7, wherein the assigning of the static designation to each chamber comprises operator manual entry thereof at an interface screen of a unit with a processor having the dynamic protocol stored thereon.

10. The method of claim 7, wherein the assigning of the static designation to each chamber comprises operator selection of a file at an interface screen of a unit with a processor having the dynamic protocol and the file stored thereon.

11. The method of claim 7, wherein the assigning of the static designation comprises assigning multiple chambers of the mobile multi-silo system a same aggregate type.

12. The method of claim 11, comprising:
filling each chamber with an aggregate type; and
storing information regarding each filled chamber and aggregate type at a processor for the running of the operation.

13. The method of claim 12, wherein classifying a single chamber of a silo as active prohibits classification of any other chamber of the silo as active.

14. The method of claim 8, wherein classifying a chamber as reserved comprises:
confirming that the chamber is available for activating at a later point in time; and
confirming that another chamber of a same designated aggregate type is both available for activating at a present time and unavailable for activating at the later point in time.

15. The method of claim 7, wherein the running of the operation at the oilfield comprises:
mixing the at least one aggregate in the mixer to form a slurry for the operation; and
performing a stimulation application in a well at the oilfield with the slurry.

16. The method of claim 15, wherein the at least one aggregate is proppant and the stimulation application includes fracturing downhole in the well.

17. A method of inventory management for aggregate held in a multi-silo system, each silo of the multi-silo system having a plurality of chambers therein, the method comprising:
calculating a weight of each silo in an empty state;
updating a respective dynamic classification associated with one chamber of each silo as active for filling with aggregate;
determining an inventory of aggregate in each filled chamber based on an increased weight of each silo less the calculated weight of each silo in the empty state;
updating the respective dynamic classification of a chamber of the multi-silo system as active for unloading;
running an operation at an oilfield with aggregate from the chamber of the multi-silo system classified as active for unloading;
updating the respective dynamic classification of each chamber of the multi-silo system during operation based at least in part on the inventory of aggregate in each chamber; and
refilling a chamber of the multi-silo system during the operation based on the respective dynamic classifications of each chamber in the multi-silo system;
wherein updating the respective dynamic classification of a particular chamber of the plurality of chambers of a silo as active for loading prohibits updating the respective dynamic classification of any other chamber of the plurality of chambers of the silo as active for loading or unloading.

18. The method of claim 17, comprising:
classifying another chamber of each silo as active for filling with aggregate, wherein classifying of either chamber of a silo as active prohibits classifying of any other chamber of the silo as active;
determining the inventory of aggregate in each of the other chambers of each silo;
and
determining the inventory of aggregate in an unloading chamber.

19. The method of claim 17, wherein the weight of each silo is obtained by a weight obtaining mechanism coupled to a processor.

* * * * *